Figure 6:
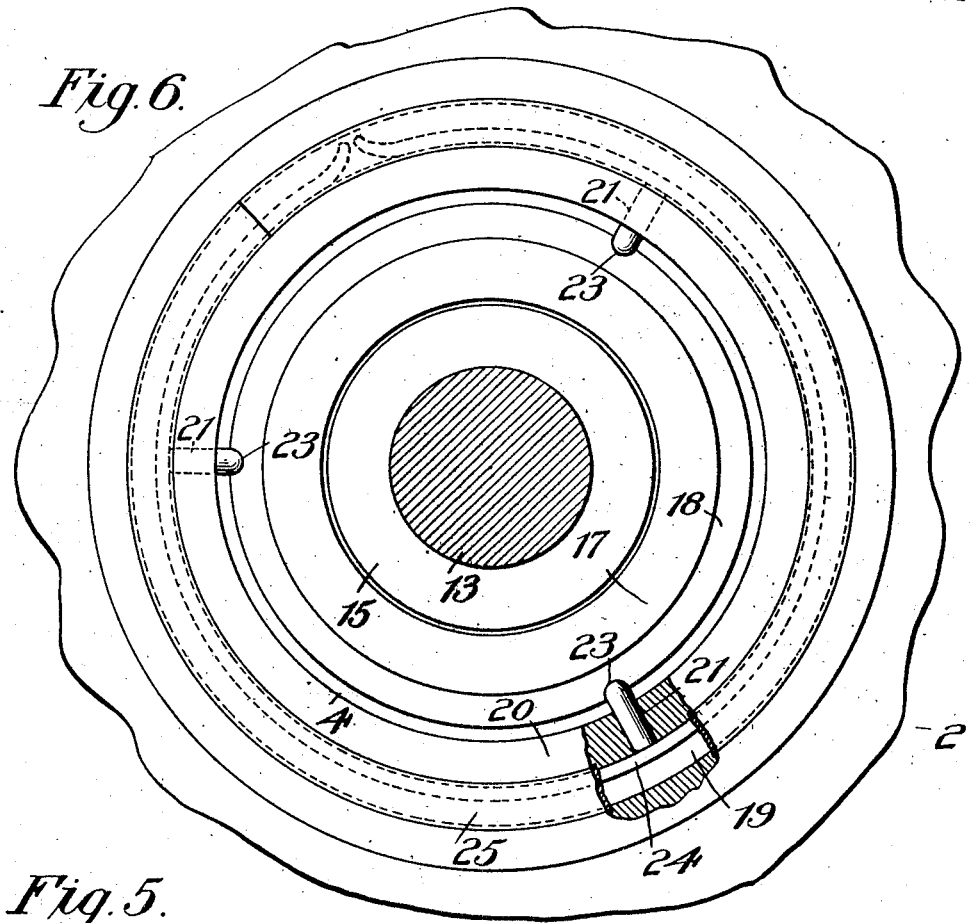

No. 872,396. PATENTED DEC. 3, 1907.
J. WILKINSON.
SHAFT PACKING FOR TURBINES.
APPLICATION FILED AUG. 17, 1905.
2 SHEETS—SHEET 1.
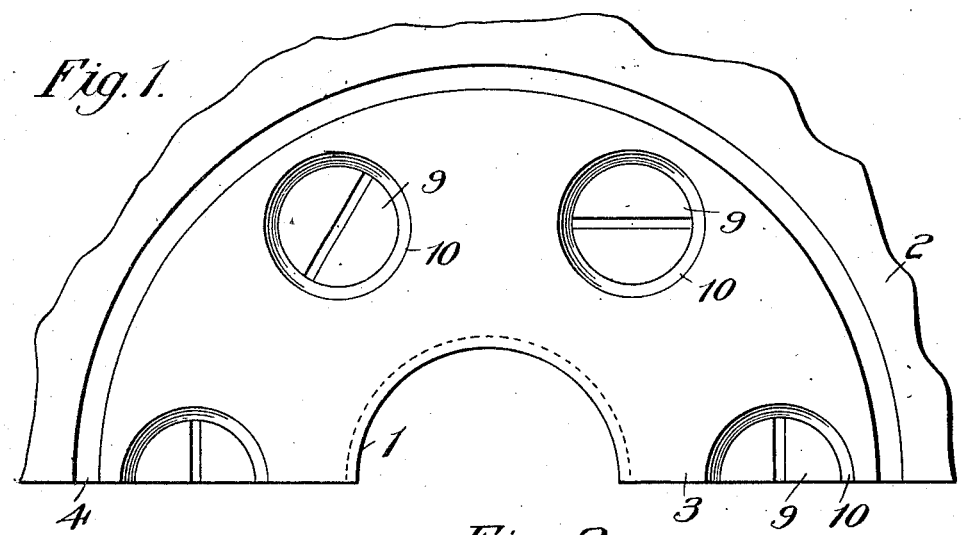
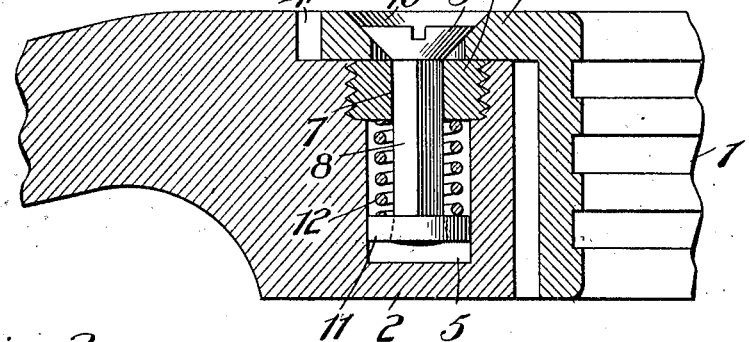
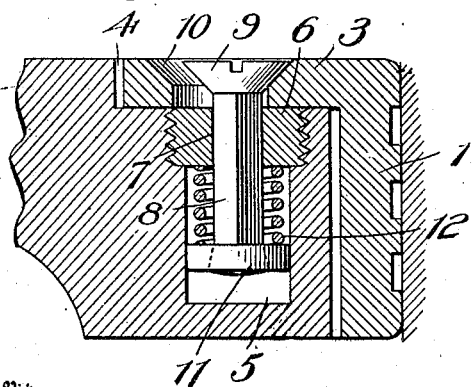
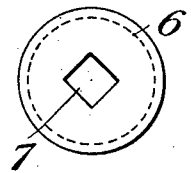
Witnesses
Edwin L. Bradford
P. H. Burch
Inventor
James Wilkinson
By
Robt. D. Johnston Jr.
Attorney No. 872,396. PATENTED DEC. 3, 1907.
J. WILKINSON.
SHAFT PACKING FOR TURBINES.
APPLICATION FILED AUG. 17, 1905.

2 SHEETS—SHEET 2.

Witnesses
Edwin L. Bradford
P. H. Burch

Inventor
James Wilkinson
By
Russell Johnston Jr.
Attorney

UNITED STATES PATENT OFFICE.

JAMES WILKINSON, OF PROVIDENCE, RHODE ISLAND, ASSIGNOR TO WILKINSON TURBINE COMPANY, OF BIRMINGHAM, ALABAMA, A CORPORATION OF ALABAMA.

SHAFT-PACKING FOR TURBINES.

No. 872,396.　　　　Specification of Letters Patent.　　　　Patented Dec. 3, 1907.

Application filed August 17, 1905. Serial No. 274,608.

*To all whom it may concern:*

Be it known that I, JAMES WILKINSON, a citizen of the United States, residing at Providence, in the county of Providence and State of Rhode Island, have invented new and useful Improvements in Shaft-Packing for Turbines, of which the following is a specification.

My invention relates to packing means for the shafts of elastic fluid turbines and rotary motors, its object being to provide flexible or yielding means for coöperating with or supporting packing rings so that they will yield or adjust themselves in a manner to prevent serious injury from contact with the shaft or parts rotatable therewith.

The high speed of shaft rotation attained in elastic fluid turbines necessitates the greatest precaution against the destructive effects of contact between the shaft or moving parts and stationary devices serving as packing. From a point of economy it is necessary that the clearances between the packing and the movable parts should be as small as possible, and where it is desired to use packing rings, interleafed glands, or similar metallic packing devices, it will be evident that the smaller the clearances, the greater the danger of a heavy frictional contact which will prove not only destructive to the packing but dangerous to the machine. If the stationary and moving parts could be made to retain their relative positions under all conditions, the packing devices could be so adjusted initially as to obtain the desired results, but this is not possible as the expansion of the stationary and moving parts may vary and move them relatively causing rigid contact of great pressure, sufficient to cause a destruction of the parts.

It is the purpose of my invention broadly to provide a yielding means which co-acts with a packing device or devices surrounding a rotatable motor element so as to enable the packing devices to follow any lateral movements of said element without materially increasing the friction between the moving and stationary parts of the packing, which would normally result from such movements.

More specifically, I propose to use packing rings, so mounted in their supports that they fit fluid tight therewith and closely surround the rotating parts, being adapted, when contact is made with the rotating parts, to yield laterally before the resulting pressure becomes injurious and adjust themselves responsive to lateral movements of the rotating parts or of the ring supports relatively to said rotating parts. Preferably the rings are supported in the diaphragms or stuffing box so that they are held against rotary movement, but have the free lateral play necessary to act as above described, the supporting means tending, however, to keep the ring concentric with the original center line of the turbine. Inasmuch as this manner of mounting the rings will enable them to readily follow any movements of the shaft with very little resistance, it follows that the clearance may be reduced to a minimum between the ring and shaft.

In its preferred form my invention comprises devices which positively hold the ring pressure tight in its supporting element and prevent rotary movement while they act yieldingly under spring tension, to normally hold the ring against lateral movement concentric with the turbine diaphragm or head. This being broadly the object of my invention I have shown and described in the accompanying drawings several constructions for carrying my ideas into effect, that shown on Sheet 1 constituting my preferred mechanism.

Figure 5:
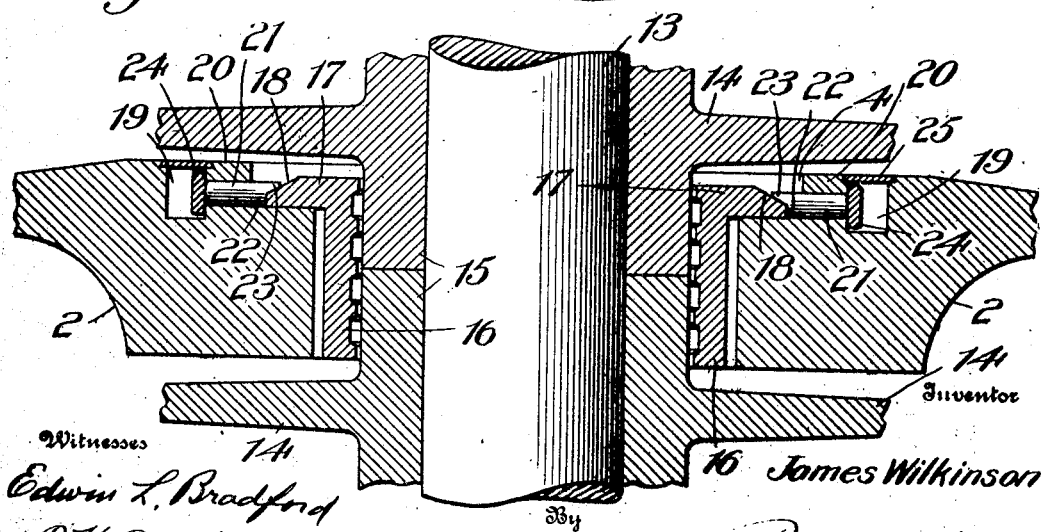

Referring to the drawings:—Figure 1, represents a partial plan view of a packing ring mounted in a head or diaphragm. Fig. 2, is a sectional view through a packing ring and one of its retaining devices mounted in a turbine diaphragm. Fig. 3, is a similar view showing the ring in a different operating position. Fig. 4, is a detail view of one of the screw nuts through which the spring retaining bolt for the ring passes. Fig. 5, illustrates a vertical sectional view showing in fuller detail a packing ring between stages in a multi-stage turbine, a modified flexible supporting means for the ring being used. Fig. 6, is a top plan view of Fig. 5.

Similar reference numerals refer to similar parts throughout the drawings.

I have illustrated my invention as applied to packing the shaft between diaphragm partitions of a multi-stage turbine, though it will be understood that the following description applies equally to the use of rings in a stuffing box for the supply or exhaust head of a turbine or other rotary motor.

The packing ring 1 is disposed in a central opening in the diaphragm partition 2, being supported by an annular flange 3, integral with the ring, which rests within a circular recess 4 in the upper face of the diaphragm. A considerable clearance is provided between the sides of the flanged ring and the diaphragm so that the ring is capable of considerable play or lateral movement. Under normal conditions, the axial or shaft packing face of the ring is disposed so as to leave a very small annular clearance between it and the shaft, water grooves or other packing means being used to reduce or prevent the leakage of pressure through this clearance.

To provide a retaining means for the ring which will prevent its rotation, due to any frictional contact with the shaft or wheel hubs, and which, at the same time, will permit it to yield radially to compensate any lateral movement of the shaft or the ring's support, I form a plurality of circular recesses 5 in the diaphragm adjacent to the central opening therein and preferably arranged equi-distantly around the latter. Screw plugs 6 close the upper ends of these chambers and are provided with squared central openings 7, through which square bolts 8 pass. These bolts have tapered heads 9 which engage in tapering countersunk openings 10 in the ring flange 3.

A plate or washer 11 is rigidly connected to the end of the bolt disposed in the chamber 5, and a coiled spring 12 is disposed between this washer and the screw plugs 6. This spring tends to force the tapering bolt head 9 downwardly so that the latter, by engaging the tapering walls of the opening 10 in the ring flange, will tend to maintain the bolt in the center of this opening. It will be noted that the same clearness is allowed between the shank of the bolt 8 and the sides of the opening 10 that exists between the ring and the diaphragm. In its normal position in the center of the opening 10, the bolt head 9 will be considerably below the upper surface of the flange 3, as seen in Fig. 2. If now the ring be moved laterally the tapering sides of the opening 10 will be moved against the tapering head 9, acting to force the latter upwardly against the action of the spring 12, which tends to hold it in its lowered position. This action is illustrated in Fig. 3, where it will be seen that the ring has been moved to the left so as to bring it nearly into engagement with the diaphragm, this movement of the ring acting to lift the bolt against the action of its spring until its head is almost on the level with the flange 3. I use a plurality of these bolts, preferably six, which serve to preserve the ring concentric with the opening in the diaphragm when not displaced by the wheel hub, since the action of the spring pressed bolts against the tapering openings 10 will be to shift the ring until the parts occupy the position shown in Fig. 2.

As illustrated on Sheet 1, the ring may pack the shaft direct or, as will be described in connection with Figs. 5 and 6, the abutting flanges of bucket wheel hubs may surround the shaft like a sleeve with which the packing ring co-acts.

Referring to Figs. 5 and 6, I show a section of a turbine shaft 13 having mounted thereon bucket wheels 14, whose flanged hubs 15 abut and form collars surrounding the shaft. The diaphragm 2 is disposed between the bucket wheels and supports a packing ring 16, similar in construction to the packing ring 2 with the exception that its flange 17 is provided with a tapering peripheral edge 18. An annular channel 19 is provided in the upper face of the diaphragm and is arranged so as to leave a division wall 20 between it and the circular recess 4 in which the flange 17 rests. A plurality of radially disposed pins 21 pass through openings in this wall 20 and are provided with a shouldered head 22 which overlaps the periphery of the flange 17, and has a tapering portion 23 which rests upon the incline surface 18 of the ring flange. A spring ring 24 is disposed in the channel 19 and adapted to engage the outer ends of the pins 21 and force them against the packing ring. This spring therefore acts through the pins to normally hold the packing ring concentric with the diaphragm opening, but it will be evident that the ring can readily follow any lateral movements of the shaft by pushing the pins opposing this movement outwardly against the action of the spring. The tapering character of the end 23 of the pins enables them to positively hold the ring to its seat throughout its adjusting movements, while their frictional engagement with the ring holds it against rotation with the shaft. The channel 19 may be closed by a cover 25, if desired.

My invention may be successfully applied wherever packing rings or interleafed glands are now used. Thus in the case of stuffing boxes for the heads of turbines, the yielding retaining means for the rings would be formed in or connected to shoulders or fixed rings in the stuffing box or to the turbine head.

Having thus described several illustrative forms embodying my present invention, I desire to protect the same without limitation to the details of construction disclosed which are to be understood as constituting my preferred forms.

Having thus described my invention, what I claim as new and desire to secure by Letters Patent, is:—

1. In a fluid motor, a rotatable driven element and means to pack it to prevent leakage between it and a part of the motor, said means comprising a packing device such as a ring, a non-rotatable element which said means engages, and metallic yieldable means to permit the packing means to yield laterally for the purposes described.

2. In a fluid motor, a rotatable element driven by the action of the fluid pressure, a packing means therefor disposed within the motor and comprising a packing device closely surrounding said element with a slight clearance, a support for said device in which it is seated pressure tight, and yielding means, surrounded by the high pressure and temperature medium in the motor, which permit the lateral adjustment of said device while normally holding it against rotation.

3. In an elastic fluid turbine, a rotor, a stationary element through which said rotor passes, a packing ring yieldingly supported in the opening in said element, and provided with an axially elongated sleeve portion surrounding said rotor.

4. In a rotary motor, a rotatable element, a circular packing device surrounding said element, a fixed support for said packing device, and means tending to hold said packing device against rotation with said element while leaving it free to follow lateral movements of said element said means being adapted to engage said device at different points around its periphery.

5. In a rotary motor, a rotating driven element, a packing ring or sleeve surrounding said element, a fixed support for said ring or sleeve in which it is seated substantially pressure tight, a plurality of devices which are yieldingly connected to said support, and adapted to engage said ring or sleeve.

6. In a rotary motor, a packing means for rotating parts comprising a packing element normally held against rotary movement, a fixed support therefor, spring means, and devices acted upon by said spring means which yieldingly oppose lateral movements of said element.

7. In a fluid motor comprising rotatable and fixed parts, a packing sleeve surrounding a rotatable part, a fixed support in which said sleeve is seated substantially pressure tight, spring means acting on said element to oppose lateral movements thereof while normally tending to maintain it in an initial position, and means to hold said element against rotation.

8. In a fluid motor, a rotary element, a stationary part through an opening in which said element passes, a packing device surrounding said rotatable element and disposed within the opening in said stationary part, a clearance between said device and the stationary part to permit the former to move laterally when pressed by the rotatable element, and spring pressed means to engage and positively hold said device against rotary movement with said element.

9. In a turbine, a supply head for a wheel compartment, an opening therein for the turbine shaft, a packing ring disposed in said opening and laterally adjustable therein, packing grooves in the ring face surrounding said shaft, spring means which tend to hold said ring concentric with said opening, and means to prevent the rotation of said ring.

10. In a turbine, a stationary element such as a supply head or diaphragm, a flanged packing element such as a ring or sleeve, carried thereby, devices carried by said head or diaphragm which engage said ring to prevent its rotation, metallic yieldable means to hold said ring against lateral movement, and a rotatable element for which said ring serves as a packing.

11. In a turbine, a stationary element such as a head or diaphragm having an opening therein through which a rotatable element passes, a packing device for said rotatable element carried by said stationary element, and a plurality of spring pressed retaining means for said packing device which permit it to readily follow the lateral movements of said rotatable element but prevent its rotation therewith.

12. In an elastic fluid turbine, a supply head for a wheel compartment having an opening therein, a shaft passing through said opening and capable of lateral play therein, a packing ring surrounding the shaft and overlapping said head, and spring pressed devices such as bolts or pins carried by said head and engaging said ring at different points around its periphery to prevent its rotation with the shaft while permitting it to have lateral play relative to the head.

13. In a turbine, a supply head for a wheel compartment having a shaft opening therein, a packing ring carried by said head, bolts having tapering heads which pass through enlarged tapering openings in said ring and are secured in said head, and spring pressed means to oppose longitudinal movement of said bolts, for the purposes described.

14. In a turbine, a head for a wheel compartment provided with a central shaft opening, transversely disposed chambers formed in said head around said opening, bolts inserted in said chambers, springs disposed in said chambers and engaging said bolts, openings in said ring of greater diameter than said bolts and provided with flaring sides, and a tapering head on each bolt which engages the tapering sides of an opening in said ring, substantially as described.

In testimony whereof I have hereunto set my hand in presence of two subscribing witnesses.

JAMES WILKINSON.

Witnesses:
C. H. MORSE,
JAMES H. NOLAN.